United States Patent
Marin et al.

(10) Patent No.: US 7,359,361 B2
(45) Date of Patent: Apr. 15, 2008

(54) TECHNIQUES FOR STREAM HANDLING IN WIRELESS COMMUNICATIONS NETWORKS

(75) Inventors: Janne Marin, Espoo (FI); Janne Tervonen, Espoo (FI)

(73) Assignee: Nokia Corporation, Espoo (FI)

( * ) Notice: Subject to any disclaimer, the term of this patent is extended or adjusted under 35 U.S.C. 154(b) by 550 days.

(21) Appl. No.: 10/978,417

(22) Filed: Nov. 2, 2004

(65) Prior Publication Data

US 2006/0176860 A1 Aug. 10, 2006

(51) Int. Cl.
  *H04Q 7/24* (2006.01)
  *H04J 1/00* (2006.01)
(52) U.S. Cl. .................................. 370/338; 370/345
(58) Field of Classification Search .................. None
  See application file for complete search history.

(56) References Cited

U.S. PATENT DOCUMENTS

| | | | | |
|---|---|---|---|---|
| 6,067,297 | A * | 5/2000 | Beach | 370/389 |
| 6,934,554 | B2 * | 8/2005 | Mizuno et al. | 455/502 |
| 2004/0013135 | A1 * | 1/2004 | Haddad | 370/493 |
| 2004/0032847 | A1 * | 2/2004 | Cain | 370/338 |
| 2004/0125775 | A1 * | 7/2004 | Rios | 370/338 |
| 2004/0189522 | A1 * | 9/2004 | Watanabe et al. | 342/387 |
| 2005/0054294 | A1 * | 3/2005 | Khun-Jush et al. | 455/63.1 |
| 2005/0058151 | A1 * | 3/2005 | Yeh | 370/445 |
| 2005/0068934 | A1 * | 3/2005 | Sakoda | 370/350 |
| 2005/0237956 | A1 * | 10/2005 | Kuperschmidt et al. | 370/310 |
| 2005/0249183 | A1 * | 11/2005 | Danon et al. | 370/347 |

OTHER PUBLICATIONS

"MBOA Wireless Medium Access Control (MAC) Specification for High Rate Wireless Personal Area Networks (WPANS)," Jay O'Conor and Ron Brown, MBOA MAC Specification Draft 0.65, Oct. 15, 2004.
"MBOA Wireless Medium Access Control (MAC) Specification for High Rate Wireless Personal Area Networks (WPANS)," Jay O'Conor and Ron Brown, MBOA MAC Specification Draft 0.72, Oct. 20, 2004.

* cited by examiner

*Primary Examiner*—Andrew C. Lee
(74) *Attorney, Agent, or Firm*—Morgan & Finnegan, LLP

(57) ABSTRACT

In a wireless communications network, data of a first data stream is transmitted during a first portion of a repeating time period, the first data stream with at least one remote device. Also control information is transmitted during a second portion of the repeating time period, the control information including an identifier of the first data stream. A predetermined time interval is observed in which the transmission of a second data stream to the at least one remote device using the reserved identifier is prohibited. This time interval follows termination of the first data stream. Also, when receiving such transmissions, the data stream is considered active until the identifier of the data stream is missing from the second portion of the repeating time period for at least a predetermined time interval.

70 Claims, 8 Drawing Sheets

TECHNIQUES FOR STREAM HANDLING IN WIRELESS COMMUNICATIONS NETWORKS

FIELD OF THE INVENTION

The present invention relates to wireless communications. More particularly, the present invention relates to techniques for assigning identifiers to streams in wireless communications networks.

BACKGROUND OF THE INVENTION

Short-range wireless proximity networks typically involve devices that have a communications range of one hundred meters or less. To provide communications over long distances, these proximity networks often interface with other networks such as cellular networks, wireline telecommunications networks, and the Internet. IEEE 802.15.3 and IEEE 802.15.3a are examples of short-range wireless communications networks.

A high rate physical layer (PHY) standard is currently being selected for IEEE 802.15.3a. The existing IEEE 802.15.3 media access control layer (MAC) is supposed to be used as much as possible with the selected PHY. Currently, there are two remaining PHY candidates. One of these candidates is based on frequency hopping application of orthogonal frequency division multiplexing (OFDM). The other candidate is based on M-ary Binary offset Keying. The OFDM proposal is called Multiband OFDM (MBO). Moreover, in order to further develop the OFDM proposal outside of the IEEE, a new alliance has been formed called the MultiBand OFDM Alliance (MBOA).

MBO utilizes OFDM modulation and frequency hopping. MBO frequency hopping may involve the transmission of each of the OFDM symbols at various frequencies according to pre-defined codes, such as Time Frequency Codes (TFCs). Time Frequency Codes can be used to spread interleaved information bits across a larger frequency band.

Presently, there is an interest within the MBOA to create a Medium Access Control (MAC) layer that would be used with the OFDM physical layer instead of the IEEE 802.15.3 MAC layer. A current version of the MBOA MAC involves a group of wireless communications devices (referred to as a beaconing group) that are capable of communicating with each other. The timing of beaconing groups is based on a repeating pattern of "superframes" in which the devices may be allocated communications resources.

MAC layers govern the exchange among devices of transmissions called frames. A MAC frame may have various portions. Examples of such portions include frame headers and frame bodies. A frame body includes a payload containing data associated with higher protocol layers, such as user applications. Examples of such user applications include web browsers, e-mail applications, messaging applications, and the like.

In addition, MAC layers govern the allocation of resources. For instance, each device requires an allocated portion of the available communication bandwidth to transmit frames. The current MBOA MAC proposal provides for resource allocation to be performed through transmissions called beacons. Devices use beacons to convey non-payload information. Each device in a beaconing group is assigned a portion of bandwidth to transmit beacons.

This approach allows the MBOA MAC to operate according to a distributed control approach, in which multiple devices share MAC layer responsibilities. A channel access mechanism, referred to as the Distributed Reservation Protocol (DRP) is an example of such shared responsibility. DRP includes basic tools for establishing and terminating a unidirectional connection between two or more devices.

DRP allows devices to make a reservation for a certain period of the data portion of the superframe. The establishment of a reservation is referred to as DRP negotiation. To establish and maintain the reservation, a device requesting a reservation transmits a DRP information element (DRP IE) during its beacon slot. The peer device(s) for the reservation also transmit the DRP IE in their respective beacon slots. These devices continue to transmit the DRP IE in their respective beacon slots of each superframe during the existence of the reservation. A reservation can be made, for example, for a stream.

Devices may not receive a transmitted DRP IE for various reasons, such as the wireless transmission environment and device mobility. Unfortunately, the current MBOA MAC Specification (version 0.72, Oct. 20, 2004) does not offer a robust approach for handling such events. Instead, missing a beacon may result in devices having inconsistent perspectives on the status of a stream. Accordingly, a more effective approach is needed.

SUMMARY OF THE INVENTION

The present invention provides techniques regarding the handling of streams. For example, in a method of the present invention, data of a first data stream with at least one remote device is transmitted during a first portion of a repeating time period (e.g., one or more media access slots). Also, control information, including an identifier of the first data stream, is transmitted during a second portion of the repeating time period (e.g., a beacon slot). The method reserves the identifier of the first data stream for a predetermined time interval in which transmission of a second data stream to the at least one remote device using the reserved identifier is prohibited. This time interval immediately follows termination of the first data stream.

According to a further method of the present invention, data of a data stream with one or more remote devices is received during a first portion of a repeating time period (e.g., one or more media access slots). Also, control information is received during a second portion of the repeating time period (e.g., a beacon slot). This control information includes an identifier of the data stream. In addition, the method considers the data stream active until the identifier of the data stream a missing from the second portion of the repeating time period for at least a predetermined time interval. Moreover, the method may consider the data stream active until a stream termination notification is received during the second portion of the repeating time period.

The repeating time period may be a MBOA superframe. Thus, the second portion may precede the first portion within each occurrence of the repeating time period. The time interval may be two or more consecutive occurrences of the repeating time period. Also, the time interval may be specified by the MBOA parameter mMaxLostBeacons.

The identifier may be a numeric value, such as a three bit binary value. Also, the identifier may be included in a distributed reservation protocol information element (DRP IE). In addition, the identifier may be generated randomly from a set of available stream ID numbers.

The present invention also provides apparatuses that provide the aforementioned features. Additionally, the present invention provides computer program products having computer program logic recorded thereon for enabling a processor in a computer system to provide the aforementioned features. Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
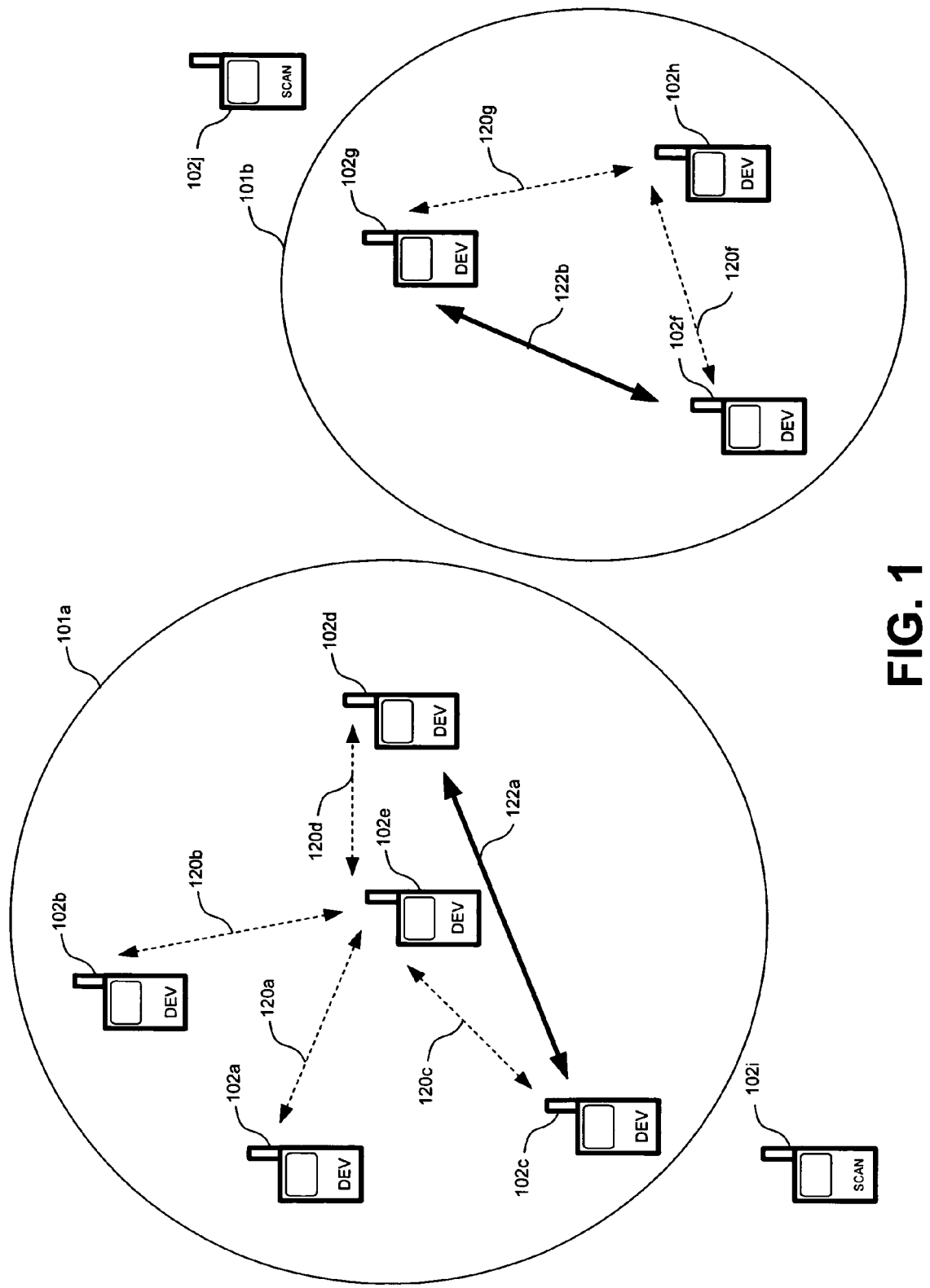
FIG. 1 is a diagram of an exemplary operational environment.

Before describing the invention in detail, it is first helpful to describe an environment in which the present invention may be employed. Accordingly, FIG. 1 is a diagram of an exemplary operational environment. This environment includes multiple beaconing groups 101, each having a plurality of devices 102. For instance, FIG. 1 shows a beaconing group 101a, which includes member devices (DEVs) 102a-e. FIG. 1 also shows a beaconing group 101b, which includes DEVs 102f, 102g, and 102h.

In beaconing group 101a, each of DEVs 102a-d may communicate with DEV 102e across a corresponding link 120. For instance, FIG. 1 shows DEVs 102a communicating with DEV 102e across a link 120a. In addition, in beaconing group 101a, each of devices 102a-e may communicate with each other directly. For instance, FIG. 1 shows DEVs 102c and 102d communicating via a direct link 122a.

In beaconing group 101b, each of DEVs 102f and 102g may communicate with DEV 102h across a corresponding link 120. For instance, DEV 102f communicates with DEV 102h across a link 120f, while DEV 102g communicates with DEV 102h across a link 120g. DEVs 102f and 102g in beaconing group 101b may also communicate with each other. For example, FIG. 1 shows DEVs 102f and 102g communicating across a link 122b.

Each of links 122 and 120 may employ various frequency hopping patterns. These patterns may include, for example, one or more Time Frequency Codes (TFCs). In embodiments of the present invention, each beaconing group 101 employs a particular frequency hopping pattern. These patterns may either be the same or different.

Figure 2:
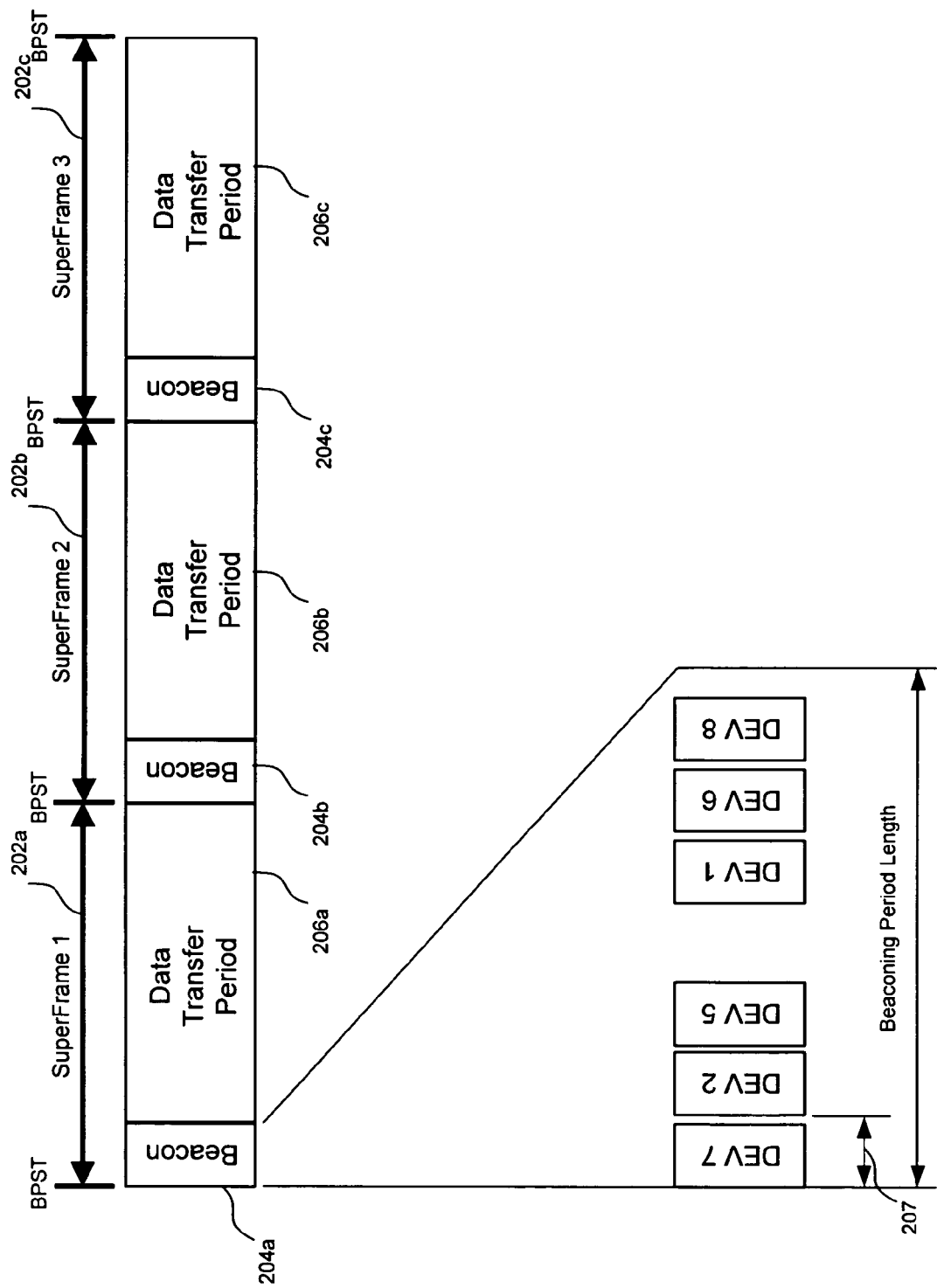
FIG. 2 is a diagram showing an exemplary MBOA superframe format.

Transmissions of beaconing groups 101a and 101b are each based on a repeating pattern called a superframe. Accordingly, FIG. 2 is a diagram showing an exemplary MBOA superframe format. In particular, FIG. 2 shows a frame format having superframes 202a, 202b, and 202c. As shown in FIG. 2, superframe 202b immediately follows superframe 202a, and superframe 202c immediately follows superframe 202b.

Each superframe 202 includes a beacon period 204 and a data transfer period 206. Beacon periods 204 are reserved for transmissions from each of the active devices in the beaconing group. Accordingly, FIG. 2 shows beacon period 204 having multiple beacon slots 207. Each of these beacon slots corresponds to a particular device in the beaconing group. During these slots, the corresponding device may transmit various overhead or networking information.

For instance, beacon slots 207 may be used to set resource allocations and to communicate management information for the beaconing group. This may include DRP reservations and the transmission of DRP IEs. In addition, data transfer periods 206 may be used to transmit information regarding services and features (e.g., information services, applications, games, topologies, rates, security features, etc.) of devices within the beaconing group. The transmission of such information in beacon periods 204 may be in response to requests from devices.

Data transfer period 206 is used for devices to communicate data according to, for example, frequency hopping techniques that employ OFDM and/or TFCs. For instance, data transfer periods 206 may support data communications across links 120 and 122. In addition, devices (e.g., DEVs 102a-e) may use data transfer periods 206 to transmit control information, such as request messages to other devices. To facilitate the transmission of traffic, each DEV may be assigned a particular time slot within each data transfer period 206. In the context of the MBOA MAC specification, these time slots are referred to as media access slots (MASs).

A MAS is a period of time within data transfer period 206 in which two or more devices are protected from contention access by devices acknowledging the reservation. MASs may be allocated by a distributed protocol, such as the distributed reservation protocol (DRP).

II. Operational Scenarios

Figure 3A:
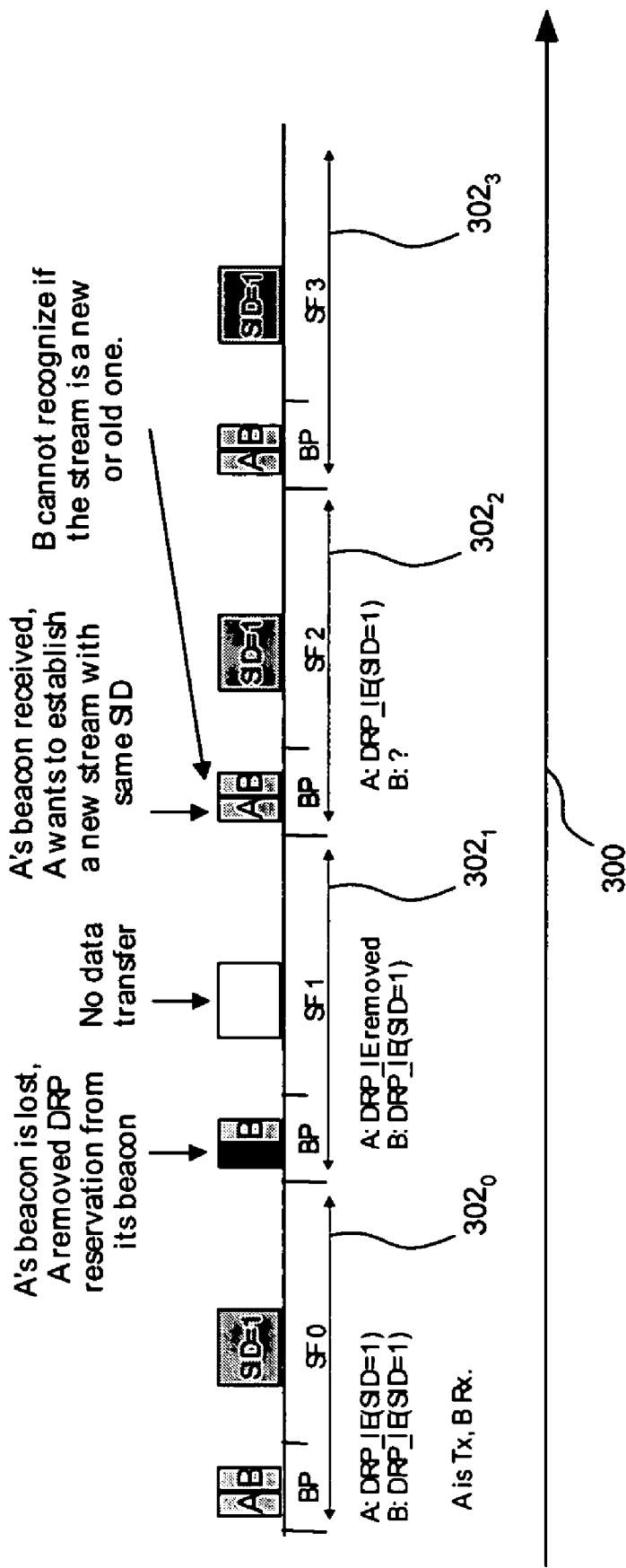
FIGS. 3A and 3B are diagrams of exemplary communications scenarios.
Figure 3B:
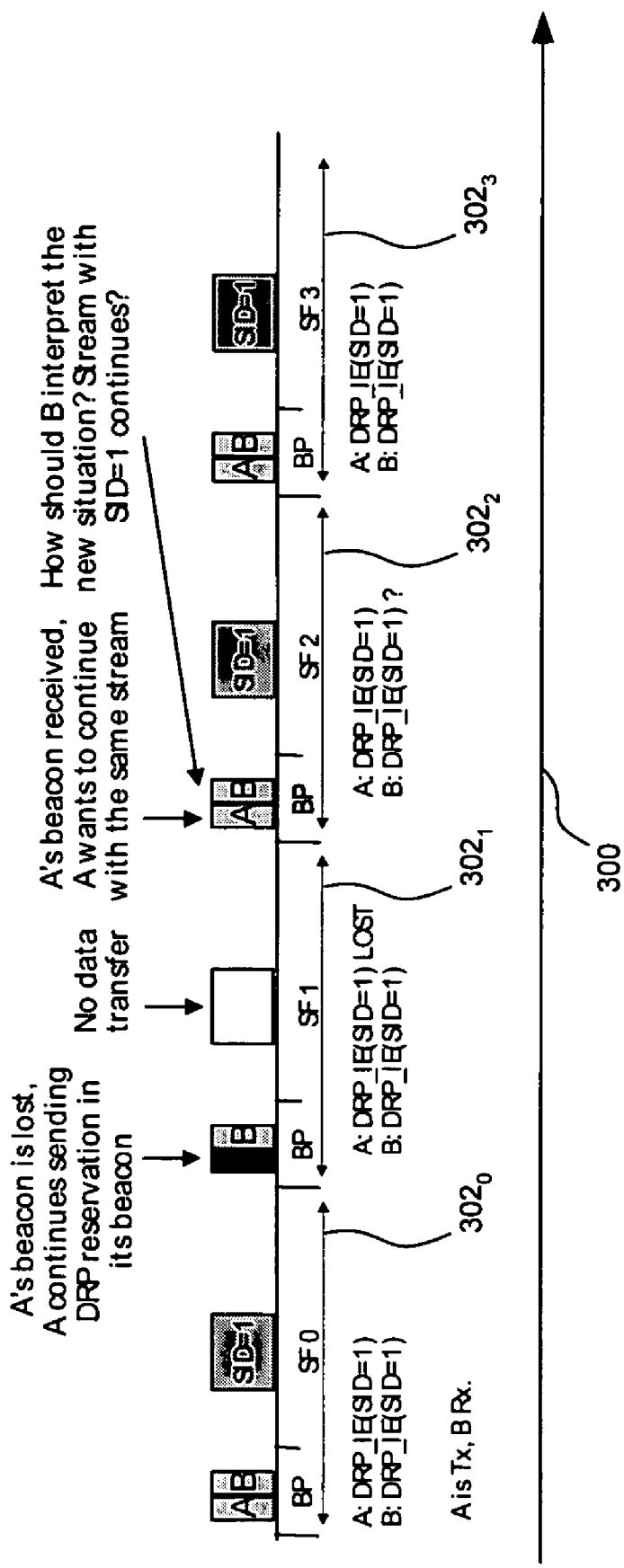

FIGS. 3A and 3B are diagrams showing exemplary problems that may occur when beacons are not received. In particular, these diagrams show a series of consecutive superframes 302 (a superframe $302_0$, a superframe $302_1$, a superframe $302_2$, and a superframe $302_3$) that occur along a time axis 300. During these superframes, a device A and a device B are involved in the transfer of data. Accordingly, both of these devices transmit beacons having DRP IEs that reserve communications resources for a particular stream. As an example, FIGS. 3A and 3B show that this stream has been assigned a Stream ID of 1.

In superframes $302_0$ and $302_2$, each device can receive the other device's beacon. However, for some reason (such as device mobility), this is not the case in superframe $302_1$. Instead, during this superframe, device A's beacon is not received by device B. However, device A can still receive device B's beacon.

In the example of FIG. 3A, a problem is caused by the loss of a stream termination notification. In particular, device A indicates in its beacon transmitted during superframe $302_1$ that it has terminated the stream corresponding to Stream ID=1. This indication is done by device A removing the corresponding Stream ID and DRP IE from its beacon.

However, in superframe $302_2$, device A wants to establish a new stream with the same Stream ID (i.e., Stream ID=1). Therefore, device A transmits in its superframe $302_2$ beacon a DRP IE having this Stream ID. Unfortunately, when device B receives this DRP IE, it cannot recognize that device A is actually establishing a new stream/connection. This is because device B never received the beacon transmitted by device A in superframe $302_1$.

FIG. 3B also illustrates the occurrence of a problem caused by the loss of a beacon transmission. Namely, in FIG. 3B, device A still wants to continue the stream corresponding to Stream ID 1. However, during superframe $302_1$, device A does not currently have data to be sent in this stream. Also, as described above, device B does not receive device A's beacon transmitted during superframe $302_1$.

Nonetheless, in superframe $302_2$, device A transmits a beacon. This beacon includes a DRP IE having a Stream ID of 1. When device B receives this beacon, it cannot be sure how to interpret this DRP IE. In particular, device B cannot determine whether this DRP IE identifies the stream in existence during superframe $302_0$ or a new stream/connection that device A is seeking to establish.

One lost beacon should not terminate the stream, especially when the stream is supposed to be continued.

III. Operation

The present invention provides approaches that allow for devices to share a common view regarding the status of a stream/connection in which they participate.

For instance, an approach of the present invention employs a predetermined time interval to guarantee that all parties (transmitting and receiving device(s)) share the same view of a terminated stream. According to this approach, the Stream ID used in the terminated stream/connection shall not be used for a new stream/connection between the same set of devices before the predetermined time interval has elapsed. After this time interval, the Stream ID may be used for a new connection and/or stream. This predetermined time interval is also referred to herein as a quarantine period.

Various values may be used for the quarantine period. For instance, in embodiments, this period is the passing of a specified number of superframes. An example of this specific number, is the parameter mMaxLostBeacons, which is specified by the current MBOA MAC specification as three superframes. Since the currently specified superframe length is 65,536 μsec, the quarantine period is 196,608 μsec. Therefore, in this embodiment, a device must wait at least this period of time before reusing a stream ID for a different stream and/or connection.

Also, according to this approach, when a device does not receive the beacon of another device, it shall consider a stream previously announced by the device as active (e.g., in a DRP IE) unless certain conditions occur. In an embodiment of the present invention, these conditions are the device receiving a transmission that terminates the stream (such as a beacon without a corresponding DRP IE) or the quarantine period elapsing.

This approach of the present invention ensures that there are no cases when a device should engage in speculation regarding the state of one or more peer devices. Also, this solution allows a stream to be continued despite the loss of one or more beacon transmissions.

Figure 4:
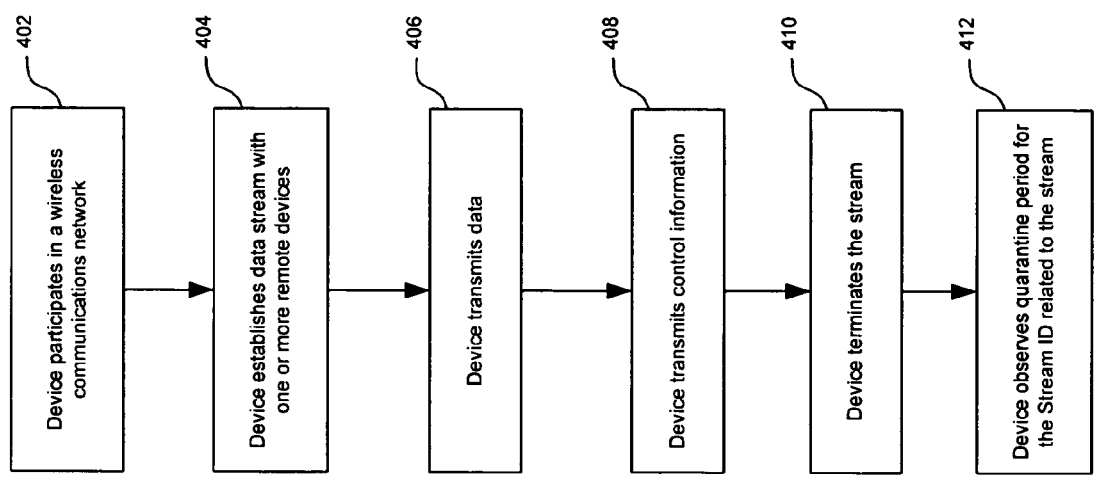
FIGS. 4 and 5 are flowcharts of device operations according to embodiments of the present invention.
Figure 5:
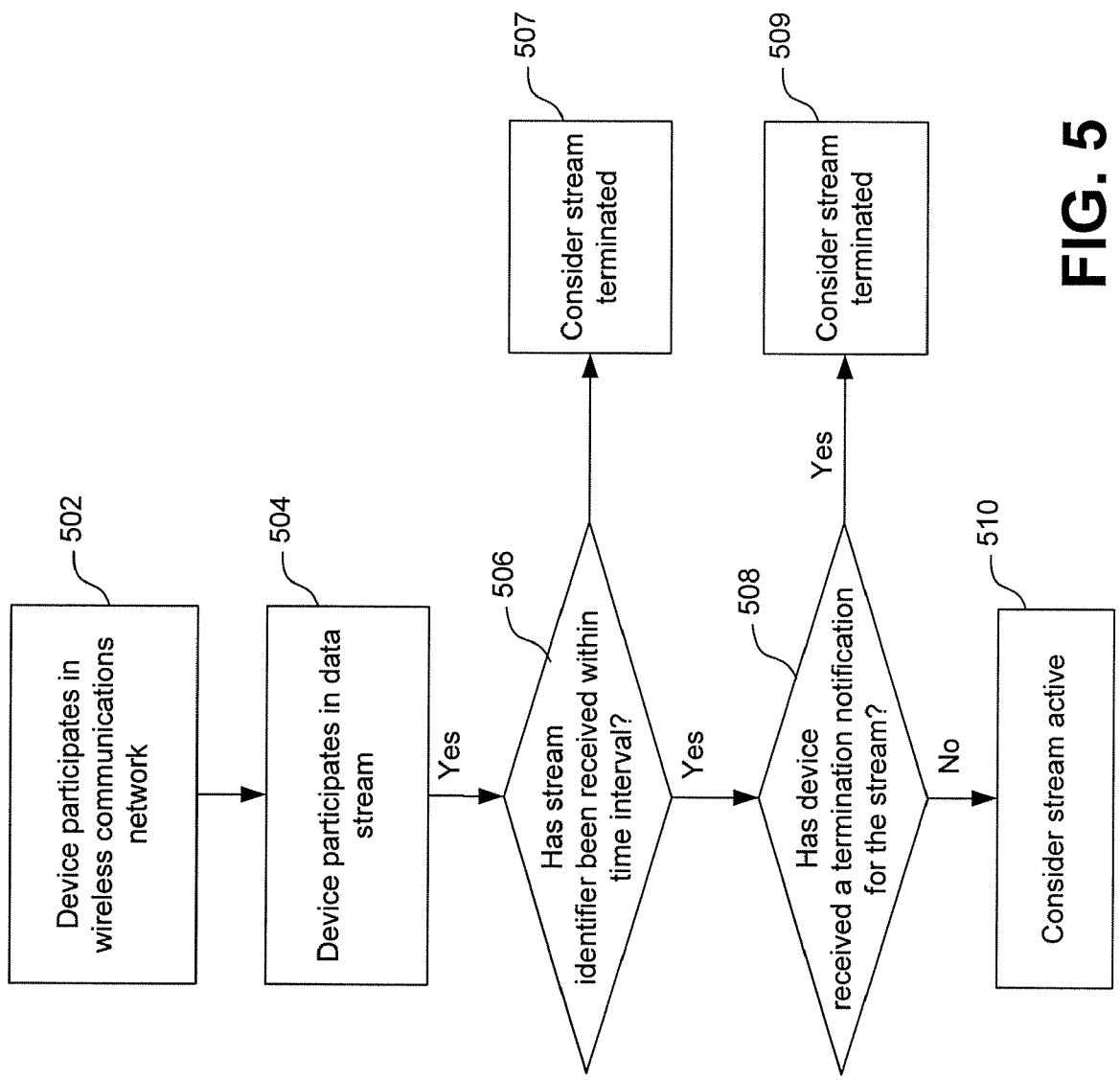

FIGS. 4 and 5 are flowcharts showing exemplary device operations according to embodiments of the present invention. These operations may be employed in environments, such as the environment of FIG. 1. Thus, these operations may involve MBOA communications. However, these operations may be applied to other environments and/or other forms of communications.

As shown in FIG. 4, this operation includes a step 402 in which a device participates in a wireless communications network, such as a beaconing group 101. Accordingly, this device is allocated a portion of an available communications bandwidth for non-payload communications, such as control information. This allocated portion may be a slot within a repeating time period. For example, this allocated portion may be a beacon slot.

In a step 404, the device establishes a data stream with one or more remote devices. This data stream may be a unidirectional stream such that it involves the one way transfer of data to the one or more remote devices. Establishment of this data stream includes an allocation of a portion of the available communications bandwidth for data transfer (e.g., one or more portions of a superframe's data transfer period). In an MBOA network, such allocations may be performed according to the distributed reservation protocol (DRP).

As described above, DRP allows devices to make a reservation for a certain period of the data portion of the superframe. The establishment of a reservation is referred to as DRP negotiation. To establish and maintain the reservation (or stream), a device requesting a reservation transmits a DRP information element (DRP IE) during its beacon slot. The other device(s) in the stream also transmit the DRP IE in their respective beacon slots. These devices continue to transmit the DRP IE in their respective beacon slots of each superframe during the existence of the stream. Therefore, step 404 may comprise the device selecting a Stream ID for the DRP IE and transmitting the Stream ID as part of the DRP IE within the device's beacon slot. In the current MBOA MAC specification, Stream IDs are allocated randomly.

As shown in FIG. 4, the device transmits data of the data stream in a step 406. Such transmissions occur within the portion of the communications bandwidth allocated in step 404. In a step 408, the device transmits control information during the portion of the repeating time period, the control information including an identifier of the first data stream, such as a DRP IE. As described above, such transmission of DRP IEs maintains the existence of the data stream.

In a step 410, the device terminates the stream established in step 404. This may involve the device refraining from the transmission of the corresponding DRP IE.

In a step 412, the device observes a quarantine period. During the quarantine period, the device is prohibited from using or transmitting the identifier (i.e., Stream ID) for a different data stream. This time interval follows termination of the data stream in step 410. Accordingly, if the device would like to employ this identifier for a new data stream, it needs to first wait for the quarantine period to elapse.

FIG. 5 is a flowchart of a device operation according to an aspect of the present invention. As shown in FIG. 5, this operation includes a step 502 in which a device participates in a wireless communications network, such as a beaconing group 101.

In a step 504, the device participates in a data stream initiated by a remote device (referred to herein as the transmitting device). This data stream may be a unidirectional stream such that it involves the one way transfer of data from the remote device. In addition other devices may also receive this unidirectional stream in a multicast or broadcast manner.

Participating in this data stream includes receiving data within a portion of the available communications bandwidth for data transfer (e.g., one or more portions of a superframe's data transfer period). In addition, participating in this data stream involves the reception of control information associated with the data stream from the remote device. This control information includes an identifier of the stream, such as a DRP IE including a Stream ID. In embodiments, this control information is received within a portion of the available communications bandwidth that is allocated to the transmitting device, such as a beacon slot.

In steps 506 and 508, the device determines whether to consider the stream active. For instance, in step 506, the device determines whether the identifier of the stream has been received within a predetermined time interval, such as the quarantine period described above. If not, then the device considers the stream terminated in a step 507.

In step 508, the device determines whether it has received from the transmitting device a termination notification for the stream. This notification may be in the form of the transmitting device not including the corresponding DRP IE. Such notifications may be within the transmitting device's beacon slot. If such a notification is received, then the device considers the stream terminated in a step 509. Otherwise, the device considers the stream active in a step 510.

IV. Further Approach

A further approach of the present invention introduces a new field to the DRP IE. The field defines the reason for adding the DRP IE to the beacon. In particular, this field (called the status field), would describes the status of the stream. When an entity makes changes to the stream, it shall state the nature of change in the status field. The status of the field can be, for example, establishing, modifying, terminating, and ongoing. The initiator of the change shall change the value of the field when making modifications to the stream. The peer entity (or entities) shall acknowledge the change in its (their) own beacon's DRP IE by modifying the corresponding value to the same as the initiator's. The initiator shall wait for acknowledgement from peer entity (or entities) and use acknowledgement(s) to determine if the peer entity (or entities) have received the beacon and noticed the change. The current MBOA specification defines a one bit field in the DRP IE for status. This field is used to indicate the creation of the DRP reservation.

V. Distributed Reservation Protocol Information Element

The format of a DRP of the MBOA MAC proposal is now described. Table 1, below, illustrates the format of a DRP IE.

TABLE 1

Distributed Reservation Protocol Information Element Format

| Octets: 1 | 1 | 2 | 2 | 3 | | 3 |
|---|---|---|---|---|---|---|
| Element ID | Length (=4 + 3 × N) | DRP Control | Destination/ Source DEVID | DRP Reservation 1 | ... | DRP Reservation N |

Table 1 shows that the DRP IE includes one or more DRP Reservation fields for the same DRP Control and Destination DEVID. Each of these DRP Reservation fileds is 3 octets in length. The format of this field is shown below in Table 2.

TABLE 2

DRP Reservation field Format

| Octets: 2 | 1 |
|---|---|
| DRP Reservation Bitmap | DRP Reservation Structure |

The DRP Reservation Structure of the DRP Reservation field specifies one or more zones within the superframe. Accordingly, DRP reservations are made based on a zoning structure. This structure divides the 256 MASs in a superframe into 16 equally sized zones numbered from 0 to 15. Each Zone contains 16 consecutive MASs, which are numbered from 0 to 15 relative to the zone they are located in. The zoning structure allows for both multiple and single zone reservations in a superframe. It also provides contiguous or non-contiguous MAS reservations across single or multiple zones.

The DRP Reservation Bitmap of the DRP Reservation field specifies which MAS in the zone(s) specified in the DRP Reservation Structure field is part of the DRP reservation.

Table 1 also shows that the DRP IE includes a two octet DRP control field. The format of this field is illustrated below in Table 3.

TABLE 3

DRP Control Field Format

| Bits: | b0-b1 | b2-b4 | b5-b7 | b8-b10 | b11-b14 | b15 |
|---|---|---|---|---|---|---|
| | ACK policy | Reservation Type | Priority | User Priority/ StreamIndex | Reserved | Status |

Table 3 shows that the DRP Control field includes multiple subfields. For instance, a ACK policy field sets the acknowledgement policy for frames transmitted in the reservation. The ACK policy field is only decoded if the reservation type is Hard or Soft. The Reservation Priority field indicates the priority of the reservation with respect to other potential reservations. The user priority/StreamIndex field indicates the user priority or stream of the data intended to be transmitted during the reservation. Thus, this field is a Stream ID.

The Reservation Type field of the DRP control field indicates the type of the reservation and is encoded as shown below in Table 4

TABLE 4

Types of DRP Reservations

| 000 | Beacon Period |
|---|---|
| 001 | Hard Reservation |
| 010 | Soft Reservation |
| 011 | Private Reservation |
| 100-111 | Reserved |

VI. Device Implementation

Figure 6:
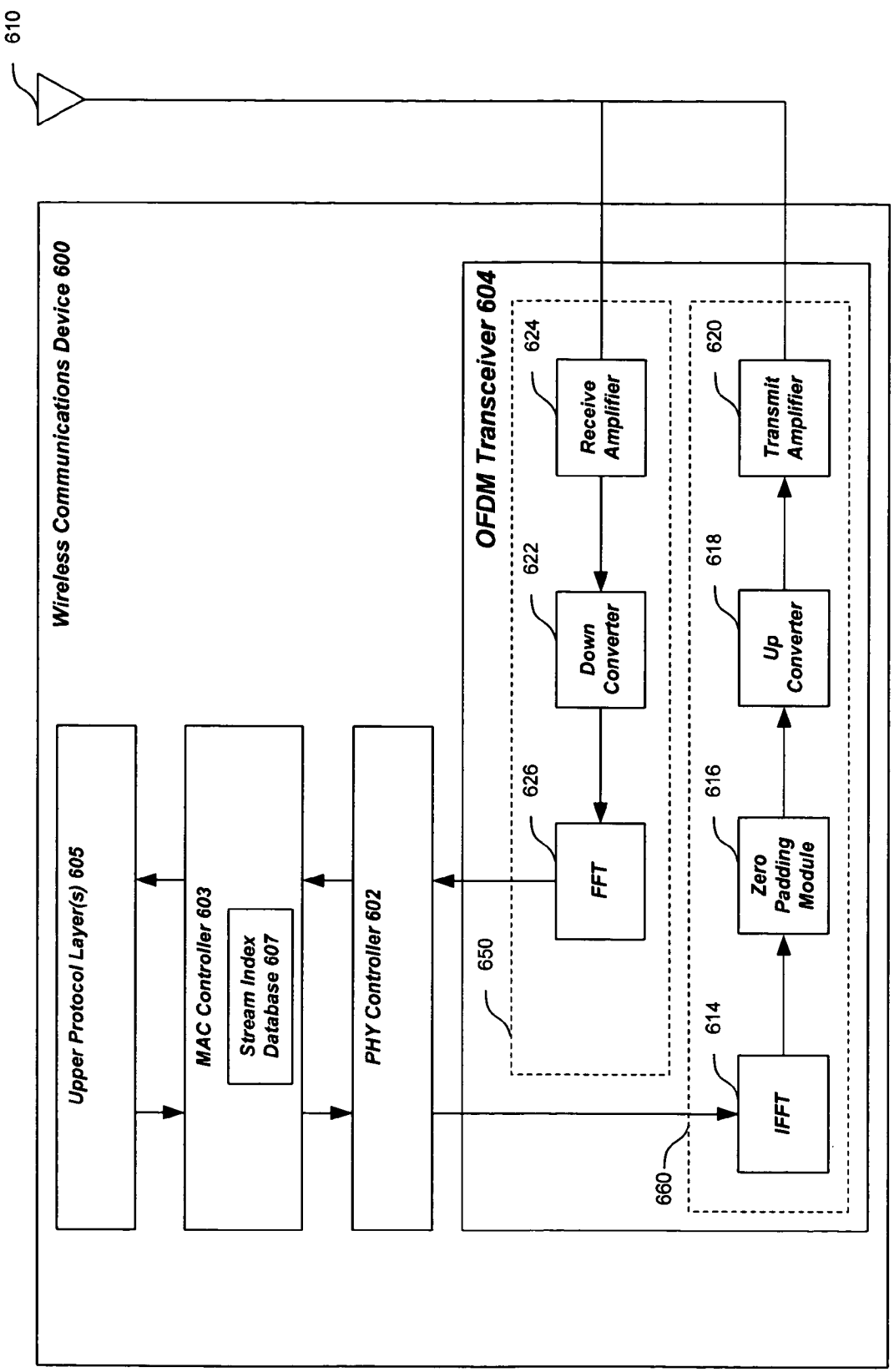
FIG. 6 is a block diagram of an exemplary wireless communications device architecture according to an embodiment of the present invention.

FIG. 6 is a diagram of a wireless communications device 600, which may operate according to the techniques of the present invention. This device may be used in various communications environments, such as the environment of FIG. 1. As shown in FIG. 6, device 600 includes a physical layer (PHY) controller 602, a media access controller (MAC) 603, an OFDM transceiver 604, upper protocol layer(s) 605, and an antenna 610.

MAC controller 603 generates frames (data transmissions) and beacons for wireless transmission. In addition, MAC controller 603 receives and processes frames and beacon transmissions that are originated from remote devices. MAC controller 603 exchanges these frames and beacon transmissions with PHY controller 602. In turn, PHY controller 602 exchanges frames and beacon transmissions with OFDM transceiver 604. Further, MAC controller 603 identifies interfering conditions and initiates the removal of such conditions. For example, in embodiments, MAC controller 603 may perform steps of FIGS. 4 and 5.

FIG. 6 shows that MAC controller 603 includes a stream index database 607. Database 607 stores information pertaining to streams with one or more remote devices. For instance, for each of the remote devices to which the device of FIG. 6 is connected, stream index database 607 maintains identifiers of active (or currently used) stream identifier(s). These identifiers may be in the form of a list, array, or other suitable storage arrangement. This information in database 607 may be dynamically updated.

By storing this information in database 607, the device may perform techniques of the present invention, such as the exemplary operations of FIGS. 4 and 5. For instance, the device may keep track of prohibited stream index/stream IDs. Moreover, database 607 may cease to identify a particular stream as active after certain events occur. Such events may include the reception of a termination notification or the elapsing of the quarantine period without receiving a stream related control information from the corresponding remote device.

FIG. 6 shows that OFDM transceiver 604 includes a receiver portion 650 and a transmitter portion 660. Transmitter portion 660 includes an inverse fast fourier transform (IFFT) module 614, a zero padding module 616, an upconverter 618, and a transmit amplifier 620. IFFT module 614 receives frames for transmission from PHY controller 602. For each of these frames, IFFT module 614 generates an OFDM modulated signal. This generation involves performing one or more inverse fast fourier transform operations. As a result, this OFDM modulated signal includes one or more OFDM symbols. This signal is sent to zero padding module 616, which appends one or more "zero samples" to the beginning of each OFDM symbol to produce a padded modulated signal. Upconverter 618 receives this padded signal and employs carrier-based techniques to place it into one or more frequency bands. These one or more frequency bands are determined according to a frequency hopping pattern, such as one or more of the TFCs. As a result, upconverter 618 produces a frequency hopping signal, which is amplified by transmit amplifier 620 and transmitted through antenna 610.

FIG. 6 shows that receiver portion 650 includes a downconverter 622, a receive amplifier 624, and a fast fourier transform (FFT) module 626. These components (also referred to as a receiver) are employed in the reception of wireless signals from remote devices. In particular, antenna 610 receives wireless signals from remote devices that may employ frequency hopping patterns, such as one or more of the TFCs. These signals are sent to amplifier 624, which generates amplified signals. Amplifier 624 sends the amplified signals to downconverter 622. Upon receipt, downconverter 622 employs carrier-based techniques to convert these signals from its one or more frequency hopping bands (e.g., TFC bands) into a predetermined lower frequency range. This results in modulated signals, which are received by FFT module 626, which performs OFDM demodulation on these signals. This demodulation involves performing a fast fourier transform for each symbol that is conveyed in the amplified signals.

As a result of this demodulation, FFT module 626 produces one or more frames, which are sent to PHY controller 602. These frames may convey information, such as payload data and protocol header(s). Upon receipt, PHY controller 602 processes these frames. This may involve removing certain PHY layer header fields, and passing the remaining portions of the frames to MAC controller 603.

As shown in FIG. 6, device 600 further includes one or more upper protocol layers 605. These layers may involve, for example, user applications. Accordingly, upper layers 605 may exchange information with remote devices. This involves layer(s) 605 exchanging protocol data units with MAC controller 603. In turn, MAC controller 603 operates with PHY controller 602 and transceiver 604 to transmit and receive corresponding wireless signals.

The devices of FIG. 6 may be implemented in hardware, software, firmware, or any combination thereof. For instance, upconverter 618, transmit amplifier 620, receive amplifier 624, and downconverter 622 may include electronics, such as amplifiers, mixers, and filters. Moreover, implementations of device 600 may include digital signal processor(s) (DSPs) to implement various modules, such as scanning module 606, IFFT module 614, zero padding module 616, and FFT module 626. Moreover, in embodiments of the present invention, processor(s), such as microprocessors, executing instructions (i.e., software) that are stored in memory (not shown) may be used to control the operation of various components in device 600. For instance, components, such as PHY controller 602 and MAC controller 603, may be primarily implemented through software operating on one or more processors.

Figure 7:
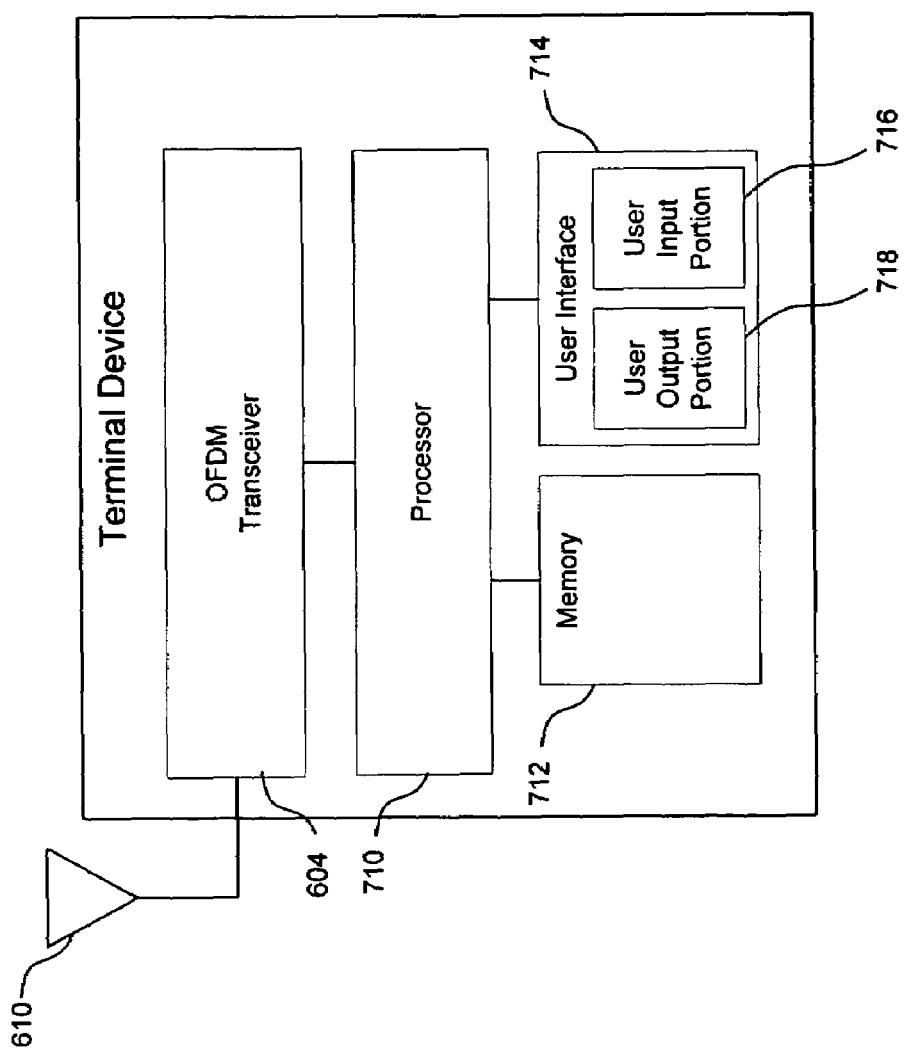
FIG. 7 is a block diagram of an exemplary implementation of a wireless communications device according to an embodiment of the present invention.

One such implementation of the FIG. 6 architecture is shown in FIG. 7. This diagram illustrates the terminal device implemented according to one embodiment of the present invention. As shown in FIG. 7, this implementation includes a processor 710, a memory 712, and a user interface 714. In addition, the implementation of FIG. 7 includes OFDM transceiver 604 and antenna 610. These components may be implemented as described above with reference to FIG. 6. However, the implementation of FIG. 7 may be modified to include different transceivers that support other wireless technologies.

Processor 710 controls device operation. As shown in FIG. 7, processor 710 is coupled to transceiver 604. Processor 710 may be implemented with one or more microprocessors that are each capable of executing software instructions stored in memory 712, for example, as a computer system.

Memory 712 includes random access memory (RAM), read only memory (ROM), and/or flash memory, and stores information in the form of data and software components (also referred to herein as modules). These software components include instructions that can be executed by processor 710. Various types of software components may be stored in memory 712. For instance, memory 712 may store software components that control the operation of transceiver 604. Also, memory 712 may store software components that provide for the functionality of PHY controller 602, MAC controller 603, and upper protocol layer(s) 605.

In addition, memory 712 may store software components that control the exchange of information through user interface 714. As shown in FIG. 7, user interface 714 is also coupled to processor 710. User interface 714 facilitates the exchange of information with a user. FIG. 7 shows that user interface 714 includes a user input portion 716 and a user output portion 718.

User input portion 716 may include one or more devices that allow a user to input information. Examples of such devices include keypads, touch screens, and microphones. User output portion 718 allows a user to receive information from the device. Thus, user output portion 718 may include various devices, such as a display, and one or more audio speakers (e.g., stereo speakers) and a audio processor and/or amplifier to drive the speakers. Exemplary displays include color liquid crystal displays (LCDs), and color video displays.

The elements shown in FIG. 7 may be coupled according to various techniques. One such technique involves coupling transceiver 604, processor 710, memory 712, and user interface 714 through one or more bus interfaces. In addition, each of these components is coupled to a power source, such as a removable and/or rechargeable battery pack (not shown).

VII. Conclusion

While various embodiments of the present invention have been described above, it should be understood that they have been presented by way of example only, and not in limitation. For instance, although examples have been described involving MBOA communications, other short-range and longer-range communications technologies are within the scope of the present invention. Moreover, the techniques of the present invention may be used with signal transmission techniques other than OFDM.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
   transmitting data of a first data stream during a first portion of a repeating time period, the first data stream associated with at least one remote device;
   transmitting control information during a second portion of the repeating time period, the control information including an identifier of the first data stream;
   reserving the identifier of the first data stream for a predetermined time interval in which transmission of a second data stream to said at least one remote device using said reserved identifier is prohibited, wherein the time interval substantially immediately follows termination of the first data stream, wherein the predetermined time interval is at least mMaxLostBeacons.

2. The method of claim 1, wherein the time interval is two or more consecutive occurrences of the repeating time period.

3. The method of claim 1, wherein the identifier is a numeric value that is randomly generated from a set of available values.

4. The method of claim 3, wherein the numeric value is represented by three bits.

5. The method of claim 3, wherein numeric value is a MultiBand OFDM Alliance (MBOA) stream index value.

6. The method of claim 1, wherein the identifier is included in a distributed reservation protocol information element (DRP 1E).

7. The method of claim 1, wherein the second portion of the repeating time period is within a beacon period.

8. The method of claim 1, wherein the second portion of the repeating time period is a beacon slot.

9. The method of claim 1, wherein the first portion of the repeating time period is within a data transfer period.

10. The method of claim 1, wherein the first portion of the repeating time period includes one or more media access slots.

11. The method of claim 1, wherein the repeating time period is a MultiBand OFDM Alliance (MBOA) superframe.

12. The method of claim 1, wherein the predetermined time interval is mMaxLostBeacons.

13. The method of claim 1, wherein the second portion precedes the first portion within each occurrence of the repeating time period.

14. An apparatus, comprising:
   a transmitter configured to transmit data of a first data stream during a first portion of a repeating time period, the first data stream associated with at least one remote device, and to transmit control information during a second portion of the repeating time period, the control information including an identifier of the first data stream; and
   a controller configured to reserve the identifier of the first data stream for a predetermined time interval in which transmission of a second data stream to said at least one remote device using said reserved identifier is prohibited, wherein the time interval substantially immediately follows termination of the first data stream, wherein the predetermined time interval is at least mMaxLostBeacons.

15. The apparatus of claim 14, wherein the time interval is two or more consecutive occurrences of the repeating time period.

16. The apparatus of claim 14, wherein the identifier is a numeric value randomly generated from a set of available values.

17. The apparatus of claim 16, wherein the numeric value is represented by three bits.

18. The apparatus of claim 16, wherein numeric value is a MultiBand OFDM Alliance (MBOA) stream index value.

19. The apparatus of claim 14, wherein the identifier is included in a distributed reservation protocol information element (DRP IE).

20. The apparatus of claim 14, wherein the second portion of the repeating time period is within a beacon period.

21. The apparatus of claim 14, wherein the second portion of the repeating time period is a beacon slot.

22. The apparatus of claim 14, wherein the first portion of the repeating time period is within a data transfer period.

23. The apparatus of claim 14, wherein the first portion of the repeating time period includes one or more media access slots.

24. The apparatus of claim 14, wherein the repeating time period is a MultiBand OFDM Alliance (MBOA) superframe.

25. The apparatus of claim 14, wherein the predetermined time interval is mMaxLostBeacons.

26. The apparatus of claim 14, wherein the second portion precedes the first portion within each occurrence of the repeating time period.

27. A computer program product comprising a computer useable medium having computer program logic recorded thereon for enabling a processor in a computer system to operate in a wireless communications device, the computer program logic comprising:
   program code for enabling the processor to provide instructions to transmit data of a first data stream during a first portion of a repeating time period, the first data stream associated with at least one remote device;
   program code for enabling the processor to provide instructions to transmit control information during a second portion of the repeating time period, the control information including an identifier of the first data stream; and program code for enabling the processor to reserve the identifier of the first data stream for a predetermined time interval in which transmission of a second data stream to said at least one remote device using said reserved identifier is prohibited, wherein the time interval substantially immediately follows termination of the first data stream, wherein the predetermined time interval is at least mMaxLostBeacons.

28. A method comprising:

receiving data of a data stream during a first portion of a repeating time period, the data stream associated with at least one remote device;

receiving control information during a second portion of the repeating time period, the control information including an identifier of the data stream; and considering the data stream active until the identifier of the data stream is missing from the second portion of the repeating time period for at least a predetermined time interval, wherein the predetermined time interval is at least mMaxLostBeacons.

29. The method of claim 28, further comprising:

considering the data stream active until a stream termination notification is received during the second portion of the repeating time period.

30. The method of claim 28, wherein the time interval is two or more consecutive occurrences of the repeating time period.

31. The method of claim 28, wherein the identifier is a numeric value that is randomly generated from a set of available values.

32. The method of claim 31, wherein the numeric value is represented by three bits.

33. The method of claim 31, wherein numeric value is a MultiBand OFDM Alliance (MBOA) stream index value.

34. The method of claim 28, wherein the identifier is included in a distributed reservation protocol information element (DRP IE).

35. The method of claim 28, wherein the second portion of the repeating time period is within a beacon period.

36. The method of claim 28, wherein the second portion of the repeating time period is a beacon slot.

37. The method of claim 28, wherein the first portion of the repeating time period is within a data transfer period.

38. The method of claim 28, wherein the first portion of the repeating time period includes one or more media access slots.

39. The method of claim 28, wherein the repeating time period is a MultiBand OFDM Alliance (MBOA) superframe.

40. The method of claim 28, wherein the predetermined time interval is mMaxLostBeacons.

41. The method of claim 28, wherein the second portion precedes the first portion within each occurrence of the repeating time period.

42. An apparatus, comprising:

a receiver configured to receive data of a data stream during a first portion of a repeating time period, the data stream associated with at least one remote device, and to receive control information during a second portion of the repeating time period, the control information including an identifier of the data stream;

a controller configured to consider the data stream active until the identifier of the data stream is missing from the second portion of the repeating time period for at least a predetermined time interval, wherein the predetermined time interval is at least mMaxLostBeacons.

43. The apparatus of claim 42, wherein the controller is further configured to consider the data stream active until a stream termination notification is received during the second portion of the repeating time period.

44. The apparatus of claim 42, wherein the time interval is two or more consecutive occurrences of the repeating time period.

45. The apparatus of claim 42, wherein the identifier is a numeric value that is randomly generated from a set of available values.

46. The apparatus of claim 45, wherein the numeric value is represented by three bits.

47. The apparatus of claim 45, wherein numeric value is a MultiBand OFDM Alliance (MBOA) stream index value.

48. The apparatus of claim 42, wherein the identifier is included in a distributed reservation protocol information element (DRP IE).

49. The apparatus of claim 42, wherein the second portion of the repeating time period is a beacon slot.

50. The apparatus of claim 42, wherein the first portion of the repeating time period is within a data transfer period.

51. The apparatus of claim 42, wherein the first portion of the repeating time period includes one or more media access slots.

52. The apparatus of claim 42, wherein the repeating time period is a MultiBand OFDM Alliance (MBOA) superframe.

53. The apparatus of claim 42, wherein the predetermined time interval is mMaxLostBeacons.

54. The apparatus of claim 42, wherein the second portion precedes the first portion within each occurrence of the repeating time period.

55. A computer program product comprising a computer useable medium having computer program logic recorded thereon for enabling a processor in a computer system to operate in a wireless communications device, the computer program logic comprising:

program code for enabling the processor to provide instructions to receive data of a data stream during a first portion of a repeating time period, the data stream associated with at least one remote device; program code for enabling the processor to provide instructions to receive control information during a second portion of the repeating time period, the control information including an identifier of the data stream; and program code for enabling the processor to consider the data stream active until the identifier of the data stream is missing from the second portion of the repeating time period for at least a predetermined time interval, wherein the predetermined time interval is at least mMaxLostBeacons.

56. The computer program product of claim 55, further comprising:

program code for enabling the processor to consider the data stream active until a stream termination notification is received during the second portion of the repeating time period.

57. A method, comprising:

allocating a first portion of a repeating time period for a device to transmit data of a first data stream, the first data stream between the device and one or more remote devices;

allocating a second portion of the repeating time period for the device to transmit control information, the control information including an identifier of the first data stream;

establishing a time interval in which the device is prohibited from transmitting the identifier for a second data stream, wherein the time interval follows termination of the user data stream, wherein the predetermined time interval is at least mMaxLostBeacons.

58. The method of claim 57, wherein the time interval is two or more consecutive occurrences of the repeating time period.

59. The method of claim 57, wherein the identifier is a numeric value that is randomly generated from a set of available values.

60. The method of claim 59, wherein the numeric value is represented by three bits.

61. The method of claim 59, wherein numeric value is a MultiBand OFDM Alliance (MBOA) stream index value.

62. The method of claim 57, wherein the identifier is included in a distributed reservation protocol information element (DRP IE).

63. The method of claim 57, wherein the second portion of the repeating time period is within a beacon period.

64. The method of claim 57, wherein the second portion of the repeating time period is a beacon slot.

65. The method of claim 57, wherein the first portion of the repeating time period is within a data transfer period.

66. The method of claim 57, wherein the first portion of the repeating time period includes one or more media access slots.

67. The method of claim 57, wherein the repeating time period is a MultiBand OFDM Alliance (MBOA) superframe.

68. The method of claim 57, wherein the predetermined time interval is mMaxLostBeacons.

69. The method of claim 57, wherein the second portion precedes the first portion within each occurrence of the repeating time period.

70. An apparatus, comprising:

means for transmitting data of a first data stream during a first portion of a repeating time period, the first data stream associated with at least one remote device;

means for transmitting control information during a second portion of the repeating time period, the control information including an identifier of the first data stream;

means for reserving the identifier of the first data stream for a predetermined time interval in which transmission of a second data stream to said at least one remote device using said reserved identifier is prohibited, wherein the time interval substantially immediately follows termination of the first data stream.

* * * * *